United States Patent [19]

Weber

[11] 4,420,824

[45] Dec. 13, 1983

[54] SONAR APPARATUS HAVING IMPROVED GAIN CONTROL

[75] Inventor: Ronald G. Weber, Tulsa, Okla.

[73] Assignee: Lowrance Electronics, Inc., Tulsa, Okla.

[21] Appl. No.: 464,414

[22] Filed: Feb. 7, 1983

Related U.S. Application Data

[63] Continuation of Ser. No. 253,216, Apr. 13, 1981, abandoned.

[51] Int. Cl.³ .................. G01S 15/08; G01S 7/52
[52] U.S. Cl. ............................ 367/98; 367/108; 367/900
[58] Field of Search ............... 367/97, 108, 900, 65, 367/66, 67, 98; 343/5 SM, 7 AG; 330/279, 280, 285

[56] References Cited

U.S. PATENT DOCUMENTS

| 4,151,481 | 4/1979 | Funston et al. | 330/279 |
| 4,198,702 | 4/1980 | Clifford | 367/900 X |
| 4,210,969 | 7/1980 | Massa | 367/108 |
| 4,274,148 | 6/1981 | Van't Hollenaar | 367/900 X |

Primary Examiner—Richard A. Farley
Attorney, Agent, or Firm—Head, Johnson & Stevenson

[57] ABSTRACT

A sonar device for use on a boat to indicate the depth of water on a digital display, including a transducer positioned in the water to transmit bursts of sound energy and for receiving echo energy reflected from the bottom, at least one variable gain receiver stage for amplifying the echo signals received by the transducer, a microprocessor for processing the amplified received signals to supply appropriate control signals to the digital display to indicate depth as a function of time required to receive echo signals, a means of controlling the gain of the receiver stage including a means with the microprocessor of supplying a plurality of paralleled output digital signals indicative of the required gain, means for converting the digital signal output to an analog gain control signal, and circuit means for applying the voltage gain control signal to the sonar receiver.

7 Claims, 1 Drawing Figure

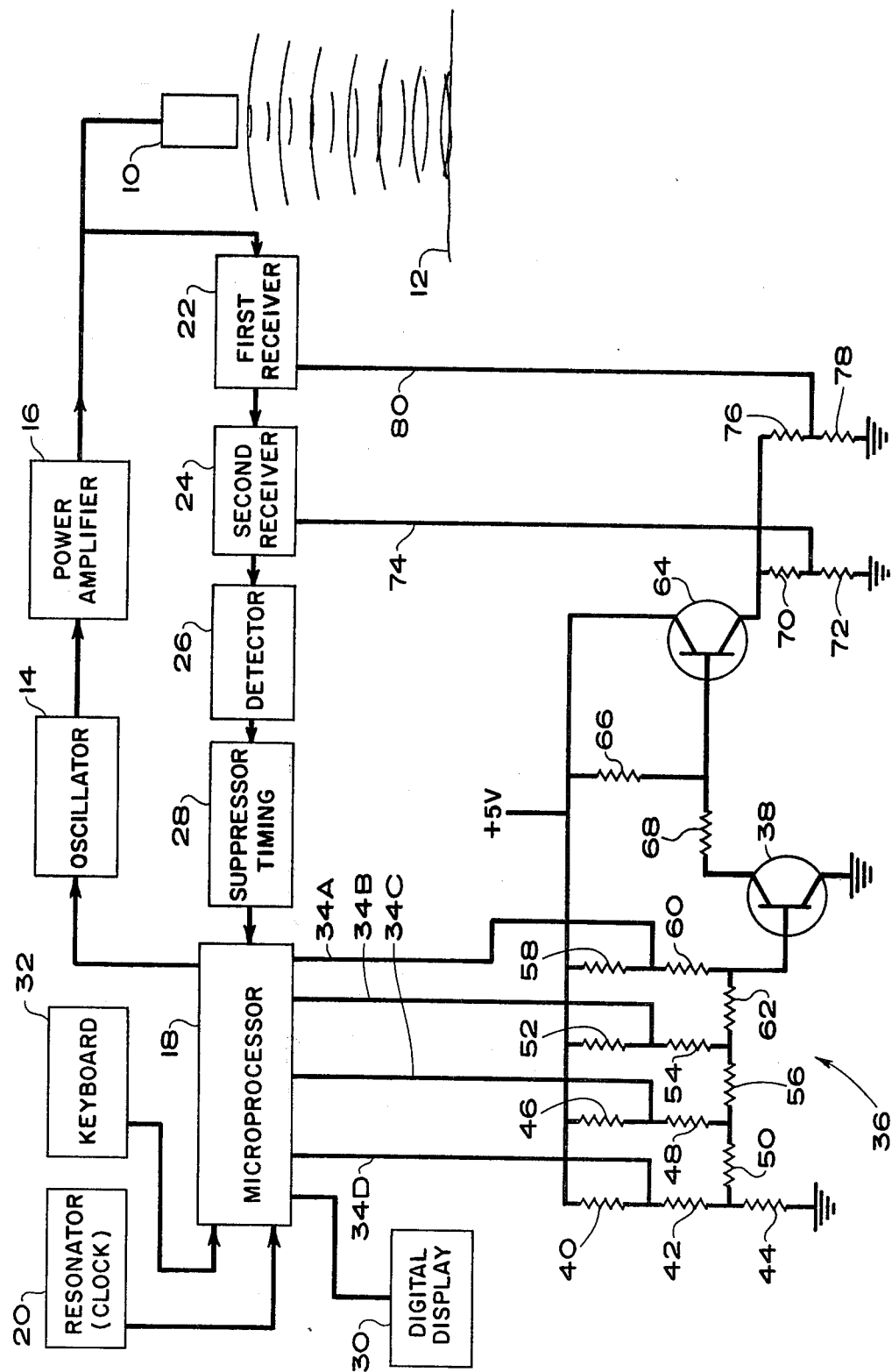

SONAR APPARATUS HAVING IMPROVED GAIN CONTROL

This is a continuation application of Ser. No. 253,216, filed Apr. 13, 1981 and now abandoned.

BACKGROUND OF THE INVENTION

1. Field of the Invention

This invention relates to sonar devices used on a boat to indicate the depth of the water. More particularly, this invention pertains to a solid state sonar apparatus for providing a digital read-out of bottom depth including means of more accurately controlling the gain of the receiver portion of the apparatus.

2. Description of the Prior Art

A commonly employed means of measuring and indicating the depth of water for use on a boat is a sonar apparatus. Sonar devices function by generating sequential bursts of sound energy, receiving energy reflected from the bottom surface, determining the depth as a function of the time which elapses from the transmission of sound energy until its reception as an echo, and displaying the depth determined on an indicating instrument.

In the past a method frequently employed for indicating depth utilizes a rotating disc having a gas filled tube carried by the disc which is illuminated when a bottom echo signals is received. A pulse of sound is transmitted at the beginning of each revolution of the disc and thereby the depth of the body of water in which the instrument is used is indicated by the angular displacement of the bulb at the time it is ignited by the received echo. Other devices for indicating depth include the use of a meter in which the depth is indicated by the quantity of current flow through the meter which in turn is proportional to the time duration required for the receipt of repeated transmitted and received sound signals.

A third type of depth indicator is a chart read-out in which a moving scriber passing over a record is energized to mark on the record in response to received echo signals. The markings on the record can be compared with depth indications on the chart as a means of indicating the bottom depth.

A fourth type of instrument for indicating the depth of water, and the type to which the present invention applies, is a digital read-out type in which the depth is indicated numerically by light emitting diode, liquid crystal, or other such devices. For certain applications, this type of depth indicator has several advantages over other types. First, by provision of a digital depth read-out, information is more precisely imparted to the viewer since it is a direct indication rather than an indirect wherein the reader must compare an indication to a scale. In addition, such digital type depth indicators may be constructed with no moving parts to thereby improve reliability and service life.

All types of sonar devices for indicating the depth of water in present use include some form of gain control. In the most rudimentary devices, gain control is manual so that the operator increases the gain as the anticipated bottom depth increases. To make the sonar devices more reliable and to remove the minute attention required by manual volume control, automatic gain control circuits have been devised and are in common use. As examples of such automatic gain control, reference may be had to U.S. Pat. Nos. 2,728,900 and 3,683,324.

These types of gain controls have normally employed one form or another of time variance. In the typical sonar device having automatic gain control the gain is set at a minimum at the time of and immediately succeeding the transmission of a burst of sonic energy by the transducer. As time increases as the transducer awaits the receipt of an echo signal from the bottom, the receiver gain is increased on the basis of the fact that the longer the time required for the reflection of a signal, the weaker the signal will be when it is received. Such types of gain controls greatly improve the performance of sonar devices with which they are used. Most presently used systems of gain controls employ time varying gain superimposed over a manual control gain. However, there is no provision in such circuits for adjusting the gain control by taking into consideration a variety of other factors.

Some digital sonars have used automatic gain controls which set receiver gain to just pick up the reflected bottom signal. The principle is that it will be the strongest reflected signal, and thus all other weaker reflected signals will not be detected. However, the bottom signal is not always the strongest signal, and thus this system is not always reliable.

Digital sonar, as commonly employed, has not given consistent reliable performance because of the difficulty in discriminating in the circuitry a valid bottom return echo in contrast to reflections from fish, micro-organisms bubbles, thermoclines, etc.

It is an object of the present invention to provide an improved digital sonar having improved gain control characteristics.

SUMMARY OF THE INVENTION

A sonar device for use on boats to indicate the depth of the water is provided. The device is particularly applicable to a digital display depth indicator wherein the depth is indicated by means of LED or liquid crystals in the present technology, or which may be indicated in some similar future technology utilizing a series of discreet digital signals to provide the numerical read-out. The sonar device functions in the manner of other devices to a certain extent in that in common with other known sonar devices, a transducer is utilized to transmit bursts of sound energy and receive echo sound signals as the sound energy is bounced from the bottom surface. The sonar device includes at least one variable gain receiver stage for amplifying the received echo signals and includes a microprocessor for processing the amplified signals to supply appropriate control signals to the digital display means. To provide a gain control signal, the microprocessor supplies a plurality of paralleled output digital signals indicative of the required gain. These digital signals are supplied in response to software employed in the microprocessor, the software functioning in response to time, signal volume, comparison of the time phase of preceding signals, etc. A circuit means is provided for converting the digital signal output to an analog gain control signal, and means are then provided for applying the analog gain control signal to the sonar receiver.

DESCRIPTION OF THE DRAWINGS

The drawing illustrates a combination schematic and wiring diagram for practicing the invention with the basic components of a digital sonar depth indicator being shown in block diagram and with the components of the improved gain control being illustrated as a wiring diagram portion of the drawing.

DETAILED DESCRIPTION

Referring to the drawing, the numeral 10 indicates a transducer which usually is in the form of a crystal. When subjected to an electrical signal, the crystal changes dimensions and is thereby able to impart sonic energy signals into water in which it is positioned. In like manner, it responds to reflected sonic signals to generate electrical signals. The transducer 10 is employed in all types of sonar devices. The water bottom is indicated by the numeral 12, and the time required for the transmission of sonic energy from the transducer 10 to the bottom 12 and receive an echo therefrom is an accurate indication of the depth of the water. The transducer 10 is actuated to produce bursts of sonic energy by an oscillator 14, the output of which is applied to a power amplifier 16 which in turn is connected to the transducer 10.

The oscillator 14 is turned on and off by means of a microprocessor 18 which employs a resonator or clock 20 to provide timing signals.

When an echo signal is received by the transducer 10, as reflected from bottom 12, an electrical signal is applied to a first receiver 22. The output of the first receiver is applied to a second receiver 24. Receivers 22 and 24 amplify the detected A.C. signal generated by transducer 10. The output of the second receiver is applied to a detector 26 where the A.C. signal is converted to a D.C. pulse which is shaped and otherwise treated in a suppressor timing circuit 28 for input into the microprocessor 18.

In the microprocessor the time lapse from the transmission of a burst of sonic energy until the reflection signal is received from the suppressor timing circuit 28 is computed and converted to a depth reading. This depth reading is fed to digital display 30 which, using present technology, is preferably a liquid crystal display or it may be a light emitting diode (LED) display, but which may be any type of digital display now or in the future available utilizing a plurality of discreet digital signals to produce visually discernable information. A keyboard 32 may be used to provide an input to the microprocessor 18 and can be used such as for changing the scale of the sonar device from feet, meters, and fathoms.

By appropriate software the microprocessor 18 is programmed to provide on a plurality of outputs a digital signal representing the desired voltage gain control. In the arrangement illustrated the digital signal appears on four outputs represented by conductors 34A through 34D. Each of the conductors 34A-34D provides a two-state signal, such as high or low, or opened to ground or closed to ground. The paralleled signal on conductors 34A to 34D represents an output of the microprocessor in the form of a 4 bit word; that is, a signal providing 16 different levels in digital format. In order to employ the digital gain control signal on conductors 34A to 34D the signal must be converted into an analog signal.

For this purpose a resistive ladder network generally indicated by the numeral 36 is employed. The ladder network transforms the digital signals on conductors 34A-34D to a bias voltage signal which is applied to the base of an emitter follower 38. Resistors 40, 42, and 44 are in series between the five-volt bus and ground. Conductor 34D from microprocessor 18 connects to the junction between resistors 40 and 42. Resistors 46, 48, and 50 are in series with resistor 44 between the five-volt bus and ground. Conductor 34C connects to the point between resistors 46 and 48. Resistors 52, 54, and 56 are in series with resistors 50 and 44 between the five-volt bus and ground with conductor 34B from the microprocessor output connected between resistors 52 and 54. In like manner, resistors 58, 60, and 62 are in series with resistors 44, 50, and 56 between the five-volt bus and ground with conductor 34A extending from the microprocessor to the junction of resistors 58 and 60. It can be seen that the bias voltage applied to the base of emitter follower 38 is a summation of the voltage drops on resistors 44, 50, 56, and 62. These voltage drops are predicated upon the state of conductors 34A-34D. Thus, 16 different output levels on the base of transducer 38 are possible. For example, if the microprocessor calls for zero gain, then the level on conductors 34A-34D are all low, causing the voltage on the base of emitter follower 38 to be essentially zero. If the microprocessor calls for maximum gain, the levels on conductors 34A through 34D are all high, causing the voltage on the base of emitter follower 38 to be at the highest value. This bias voltage is applied from the emitter follower to the base of transistor 64. Load resistors 66 and 68 connect the emitter of transistor 38 to the five-volt bus. In the emitter circuit of transistor 64 a divider network consisting of resistors 70 and 72 is selected to provide the range of bias voltage which is applied by conductor 74 to second receiver 24. In like manner, the voltage dividing network consisting of resistors 76 and 78 provides, on conductor 80, the bias voltage for first receiver 22.

By proper software the microprocessor can provide a digital signal on conductors 34A-34D to achieve a gain control which is indicative of the detection of a valid bottom echo signal by creating a history of bottom echos and comparing presently received echo signals with past echo signals and thereby regulate the gain control such as to prohibit the gain going any higher than necessary for a valid bottom echo signal. The microprocessor may be programmed in a rather simple straightforward way, or a complex way, depending upon the desires of the practitioner.

While the circuit of this invention may be fabricated of a variety of different components, excellent results employing the principles of the invention have been achieved wherein the microprocessor is a type 8048 manufactured by Intel Corporation, wherein the emitter follower 38 is a type of 2N6037 transistor and transistor 64 is a type 2N3840 and wherein the resistive networks have the following resistance values:

| Resistor | Value Ohms |
| --- | --- |
| 40 | 10k |
| 42 | 200k |
| 44 | 200k |
| 46 | 10k |
| 48 | 200k |
| 50 | 100k |
| 52 | 10k |
| 54 | 200k |
| 56 | 100k |
| 58 | 10k |
| 60 | 200k |
| 62 | 100k |
| 66 | 10k |
| 68 | 15k |
| 70 | 47k |
| 72 | 10k |

-continued

| Resistor | Value Ohms |
|---|---|
| 76 | 47k |
| 78 | 10k |

It is emphasized that these components and resistive values are given purely by way of example. The specific apparatus and values utilized will depend on many other circuit factors at the option of the practitioner.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed:

1. A sonar device for use on a boat to indicate the depth of water on a digital display including a transducer positioned in the water to transmit bursts of sound energy and for receiving echo energy reflected from the bottom, at least one variable gain receiver stage for amplifying the echo signals received by the transducer, the gain of said variable gain receiver stage being a function of an analog gain control voltage applied to said receiver; means for controlling the gain of said receiver stage comprising;
   (a) a microprocessor means for processing the amplified received signals to determine the time of travel of said transmitted and reflected signals, and to supply appropriate control signals to the digital display to indicate depth of the reflector as a function of time required to receive the echo signals;
   (b) said microprocessor means supplying also binary control signals to at least four parallel inputs to a ladder type resistive network means;
   (c) said ladder type resistive network means in cooperation with at least one stage of emitter following providing a variable d.c. analog gain control signal to said variable gain receiver stage.

2. A sonar device according to claim 1 including a plurality of variable gain receiver stages and means of applying the gain control signal to each said receiver stages.

3. The gain control as in claim 1 in which said ladder type resistive means comprises at least three pairs of series resistances, the first ends of each of the pairs connected together and to a source of d.c. potential; the second end of the first pair connected through a resistance to ground; the second end of the second pair connected through a resistance to the second end of said first pair; the second end of the third pair connected through a resistance to the second end of said second pair and also to the base of said at least one stage of emitter follower; the first, second, and third binary control signals connected respectively to the midpoints of said first, second, and third pairs.

4. A sonar device for use in water to indicate the depth of a reflector, such as the bottom of the body of water, on a display, including a transducer positioned in the water to transmit bursts of sound energy and for receiving echo energy reflected from the reflector, at least one variable gain receiver stage for amplifying the echo signals received by the transducer, the gain of the variable gain receiver stage being a function of an analog gain control voltage applied to said receiver, means for controlling the gain of said receiver stage comprising a microprocessor means for processing the amplified received signals to determine the time of travel of said transmitted and reflected signals, and to supply appropriate control signals to the display to indicate depth of the reflector as a function of time required to receive the echo signals, and for supplying a plurality of binary control signals to the parallel inputs of a ladder type resistive network, the output of the resistive network providing a gain control signal to the receiver stage.

5. A sonar device according to claim 4 wherein the output of the gain control circuit is applied to an emitter follower circuit, the gain control signal being obtained from the emitter follower circuit.

6. A sonar device according to claim 4 wherein the microprocessor provides a binary gain control signal on at least two parallel outputs, each output being connected to a resistive network across a voltage source, a resistor in each network being in series with a resistor in each of the other networks, the analog gain control signal being derived from the summation of the voltage drop across the series resistors.

7. A sonar device according to claim 4 including a plurality of variable gain receiver stages and means wherein the output of the reistive network provides gain control signals to each said receiver stages.

* * * * *